United States Patent
Thompson (10) Patent No.: US 10,775,551 B2
(45) Date of Patent: *Sep. 15, 2020

(54) LIGHTING DISPLAY ASSEMBLY FOR A GAMING MACHINE

(71) Applicant: Aristocrat Technologies Australia Pty Limited, North Ryde, NSW (AU)

(72) Inventor: David Thompson, Narrabeen (AU)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 29 days.

This patent is subject to a terminal disclaimer.

(21) Appl. No.: 16/250,588

(22) Filed: Jan. 17, 2019

(65) Prior Publication Data

US 2020/0233137 A1 Jul. 23, 2020

(51) Int. Cl.
*G02F 1/1333* (2006.01)
*F21V 8/00* (2006.01)
*G07F 17/32* (2006.01)
*H05B 47/10* (2020.01)

(52) U.S. Cl.
CPC ............ *G02B 6/006* (2013.01); *G02B 6/009* (2013.01); *G02B 6/0023* (2013.01); *G02B 6/0068* (2013.01); *G02B 6/0093* (2013.01); *G07F 17/3211* (2013.01); *H05B 47/10* (2020.01)

(58) Field of Classification Search
None
See application file for complete search history.

(56) References Cited

U.S. PATENT DOCUMENTS

| | | | |
|---|---|---|---|
| 7,442,125 B2 | 10/2008 | Paulsen et al. |
| 9,869,812 B2 | 1/2018 | Takagi et al. |
| 9,875,599 B2 | 1/2018 | Onitsuka |
| 10,031,274 B2 | 7/2018 | Muraoka et al. |
| 2004/0223093 A1 | 11/2004 | Nakayoshi et al. |
| 2011/0096568 A1 | 4/2011 | Schattinger et al. |
| 2016/0377791 A1 | 12/2016 | Muraoka et al. |
| 2018/0164492 A1 | 6/2018 | Takagi et al. |
| 2018/0182201 A1 | 6/2018 | Fujita et al. |
| 2018/0330568 A1 | 11/2018 | Glenn et al. |

FOREIGN PATENT DOCUMENTS

| | | |
|---|---|---|
| JP | 2003519810 | 6/2003 |
| JP | 2011232717 | 11/2011 |
| JP | 2011244930 | 12/2011 |
| JP | 2015088489 | 5/2015 |

*Primary Examiner* — Elmito Breval
(74) *Attorney, Agent, or Firm* — McAndrews, Held & Malloy, Ltd.

(57) ABSTRACT

A lighting display assembly for use with a display monitor includes a light guide plate and a light source. The light guide plate is formed from a single piece of material that is transparent to visible light. The light guide plate includes a center opening extending between its front and rear surfaces and defining an inner sidewall. The light source is configured to emit visible light and is positioned facing the inner sidewall so that light emitted therefrom passes through the inner sidewall and into the light guide plate. A pattern is formed in the light guide plate and positioned to be illuminated by the visible light emitted from the light source so that the illuminated pattern is visible through the front surface of the light guide plate. The lighting display assembly is mounted behind a display monitor and is sized to extend laterally beyond an outer peripheral edge of the display monitor such that the illuminated pattern is visible from in front of the display monitor.

24 Claims, 14 Drawing Sheets

LIGHTING DISPLAY ASSEMBLY FOR A GAMING MACHINE

RELATED APPLICATIONS

Not Applicable

BACKGROUND

Given the variety of options that compete for the available pool of gambling dollars, gaming machine manufacturers go to great lengths to design machines that attract players and maintain their engagement. In this regard, gaming machines often include lighted displays that incorporate colors and themes consistent with the games offered on the machine. The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. Accordingly, there is a continuing need for gaming machine manufacturers to develop new games in order to maintain or increase player enjoyment.

SUMMARY

Aspects of the present disclosure relate to a lighting display assembly for a gaming machine.

Certain aspects of the present disclosure relate to a lighting display assembly comprising a light guide plate and a light source. The light guide plate is formed from a single piece of material that is transparent to visible light. The light guide plate includes a center opening extending between its front and rear surfaces and defining an inner sidewall. The light source is configured to emit visible light and is positioned facing the inner sidewall so that light emitted therefrom passes through the inner sidewall and into the light guide plate. A pattern is formed in the light guide plate and positioned to be illuminated by the visible light emitted from the light source so that the illuminated pattern is visible through the front surface of the light guide plate. A lighting controller may be provided to controllably activate and deactivate the light source.

In some embodiments, the pattern redirects at least a portion of the visible light emitted from the light source and entering the sidewall wall of the light guide plate towards the front surface of the light guide plate. In certain embodiments, the pattern may reflect and/or refract at least a portion the visible light emitted from the light source and entering the sidewall of the light guide plate towards the front surface of the light guide plate light.

Embodiments of the lighting display assembly may include a rear panel configured to support the light source relative to the light guide plate. In certain embodiments, the light source may include a lighting bracket that carries a plurality of light emitting diodes. The lighting bracket may be mounted to the rear panel such that the plurality of light emitting diodes align with the sidewall of the light guide plate so that light emitted therefrom passes through the inner sidewall and into the light guide plate. Some embodiments include a plurality of the lighting brackets, where each lighting bracket includes a plurality of light emitting diodes.

In some embodiments, the rear panel may include a center opening that aligns with the center opening of the rear panel.

Some embodiments may also include a protective cover overlying the light guide plate. The protective cover may include a center opening that aligns with the center opening of the light guide plate.

In some embodiments, the pattern is formed in the rear surface of the light guide plate. In certain embodiments, the pattern may be laser etched into the rear surface of the light guide plate. In some embodiments, the pattern may be screen printed onto the rear surface of the light guide plate.

Some embodiments of the disclosure relate to a gaming machine that includes a cabinet, a display monitor, and a lighting display assembly. The display monitor may be supported by the cabinet with the lighting display assembly being positioned behind the display monitor. The lighting display assembly may include a light guide plate and a light source. The light guide plate may be formed from a single piece of material that is transparent to visible light. The light guide plate may include a center opening extending between its front and rear surfaces and defining an inner sidewall of the light guide plate. The light source is configured to emit visible light and is positioned facing the inner sidewall so that light emitted therefrom passes through the inner sidewall and into the light guide plate. A pattern is formed in the light guide plate and is positioned to be illuminated by the visible light emitted from the light source and entering the sidewall of the light guide plate so that the illuminated pattern is visible through the front surface of the light guide plate. The gaming machine may also include a controller configured to controllably activate and deactivate the light source.

In some embodiments, the light guide plate is sized to extend laterally beyond the outer peripheral edge of the display monitor such that the illuminated pattern is visible from in front of the display monitor. In certain embodiments, the center opening of the light guide plate may be positioned inward of the outer peripheral edge of the display monitor.

In some embodiments, the lighting display assembly may include mounting features configured to secure the lighting display assembly to at least one of the cabinet and/or the display monitor.

In some embodiments, the gaming machine includes a display mounting mechanism for mounting the display monitor to the gaming machine. In certain embodiments, the display mounting mechanism may extend through the center opening of the light guide plate.

BRIEF DESCRIPTION OF THE DRAWINGS

Features and advantages of certain embodiments of the present invention will become apparent from the following description of embodiments thereof, by way of example only, with reference to the accompanying drawings, in which.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Figure 1A:
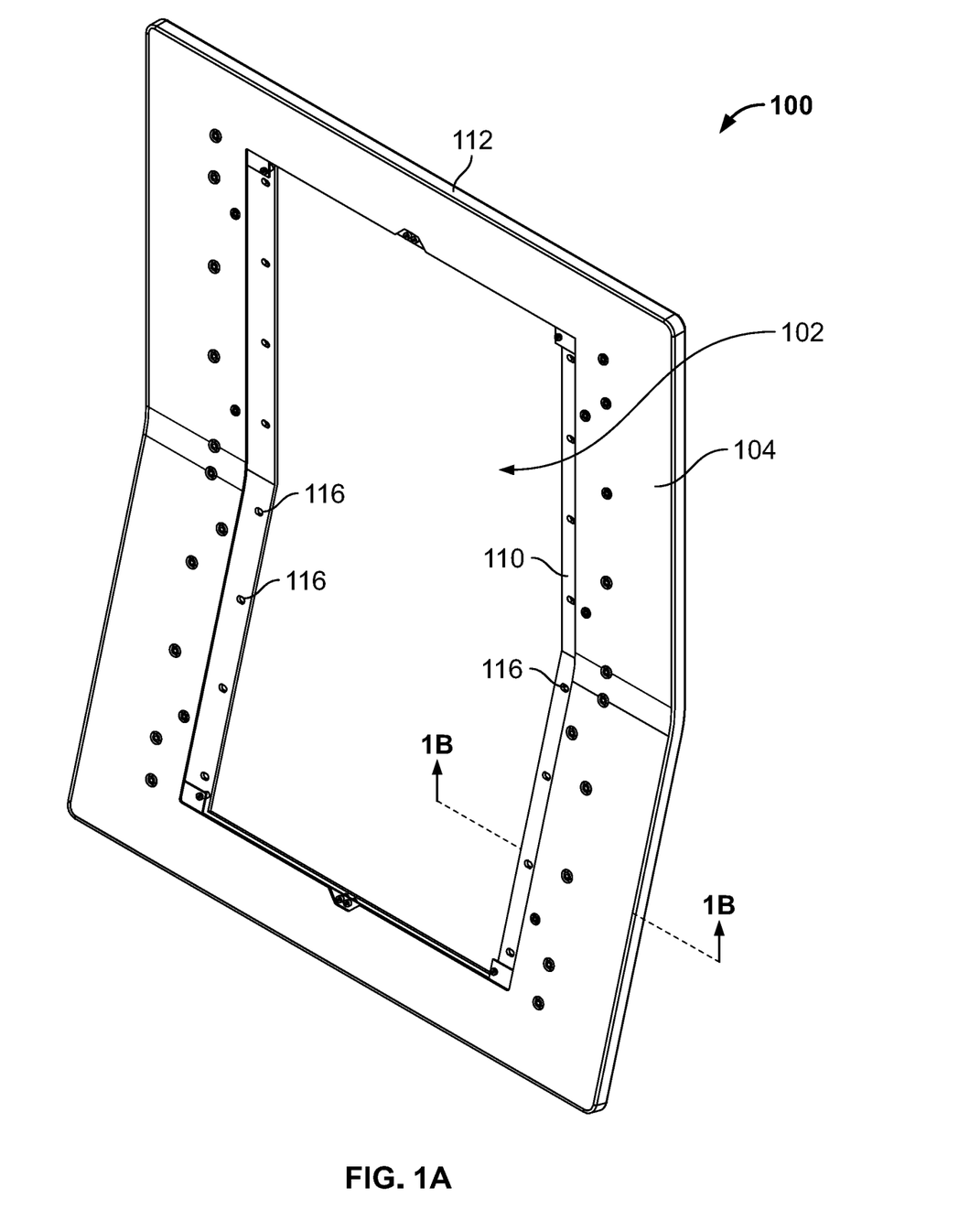
FIG. 1A is a perspective view of a lighting display assembly according to an exemplary embodiment of the present disclosure.
Figure 1B:
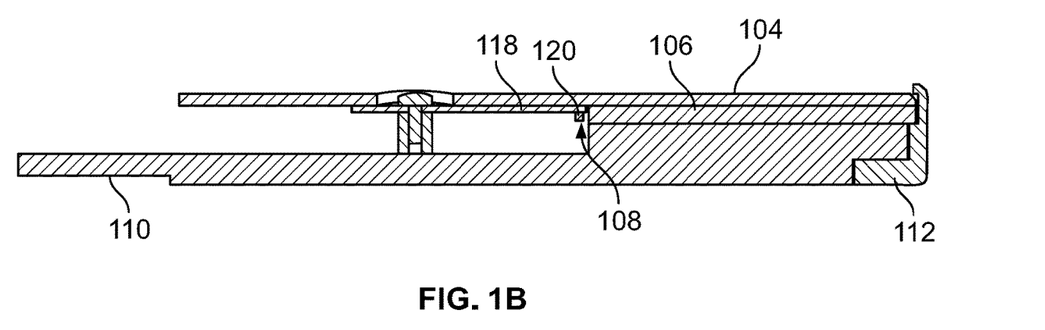
FIG. 1B is a cross-sectional view along line 1B-1B of FIG. 1A.

Referring to the drawings, there are shown example embodiments of lighting display assembly for a gaming machine. FIG. 1A is a perspective view of a lighting display assembly according to an exemplary embodiment of the present disclosure. As described in greater detail below, the lighting display assembly is configured for use with a gaming machine, such as a slot machine, and is designed to be mounted behind a video display of the gaming machine. In the illustrate embodiment, the lighting display assembly 100 has a generally rectangular shape to conform to the shape of the video display of the gaming machine. It will be appreciated, however, that the lighting display assembly 100 may take other shapes, e.g., circular, depending on design and other considerations. The lighting display assembly 100 includes a center opening 102 to facilitate its installation on a gaming machine, as is explained in greater detail below.

With further reference to FIGS. 1B to 2G, the lighting display assembly includes a protective cover 104, a light guide plate 106, a light source 108, a rear panel 110, and a plurality of side covers 112.

The rear panel 110 serves as the mounting platform for the other components and also includes features that permit the lighting display assembly 100 to be mounted to a gaming machine. The rear panel 110 may be formed from a durable, light-weight material. In some embodiments, the rear panel 110 may be cast from aluminum. Other suitable materials include plastics, such as a PVC or ABS plastic.

The rear panel 110 may be generally rectangular and includes a center opening 114. A plurality of apertures 116 positioned along the center opening 102 permit the rear panel 110 (and hence the lighting display assembly 100), to be secured to a gaming machine by threaded fasteners, such as bolts.

The light source 108 includes at least one lighting bracket 118 configured to be mounted to and supported by the rear panel 110. In the illustrated embodiment, the light source 108 includes eight (8) lighting brackets 118a-118g. Other embodiments may utilize a larger or smaller number of lighting brackets depending, for example, on design, manufacturing and assembly considerations. The rear panel 110 presents a plurality of first (or outer) bosses 122 that extend upwardly from its front face 124. Fasteners 126, e.g., bolts, extend through apertures 128 in the lighting brackets 118a-g and thread into the first bosses 122 to secure the lighting brackets 118a-g to the rear panel.

Figure 2A:
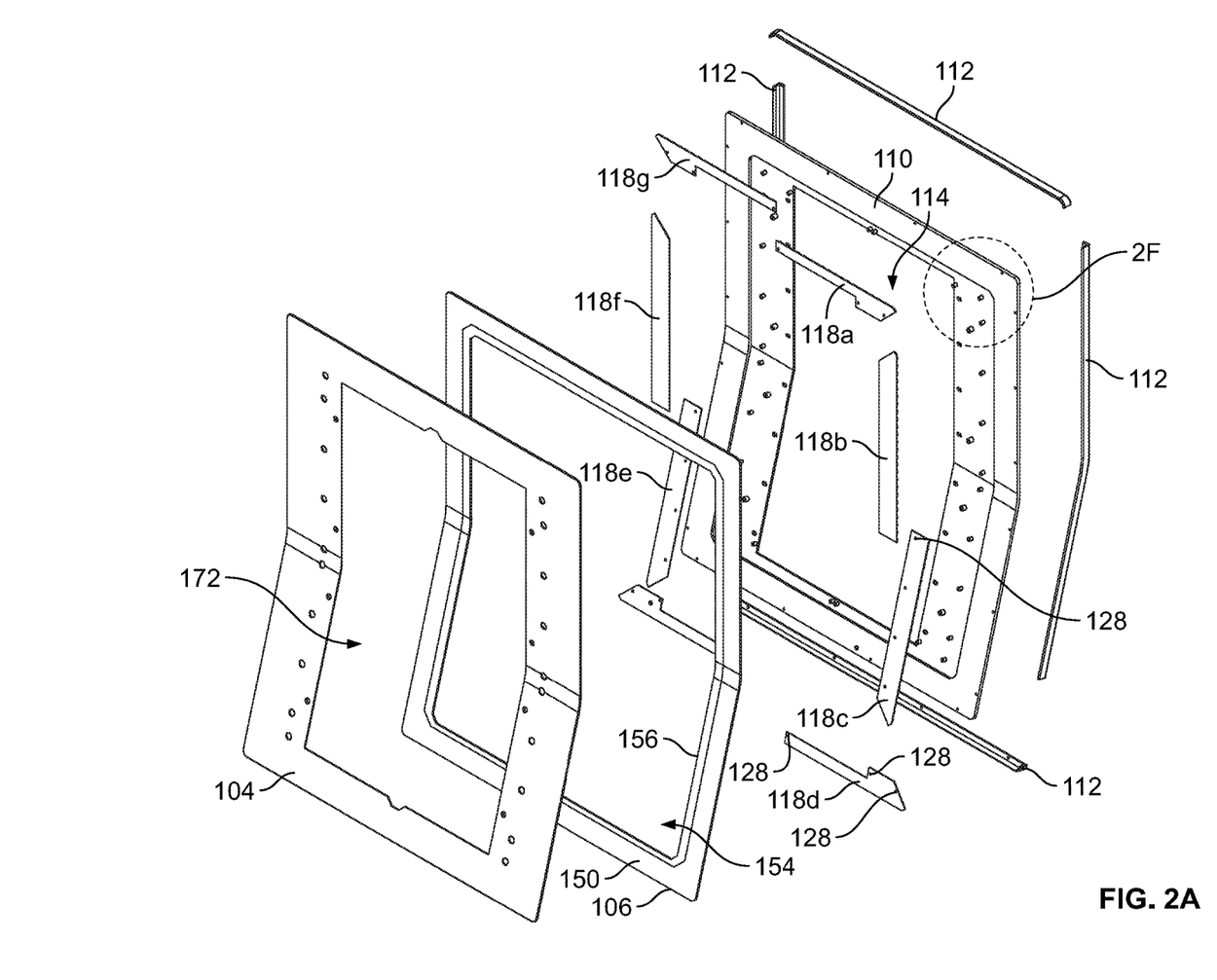
FIGS. 2A to 2C are exploded perspective views of the lighting display assembly of FIG. 1A.
Figure 2B:
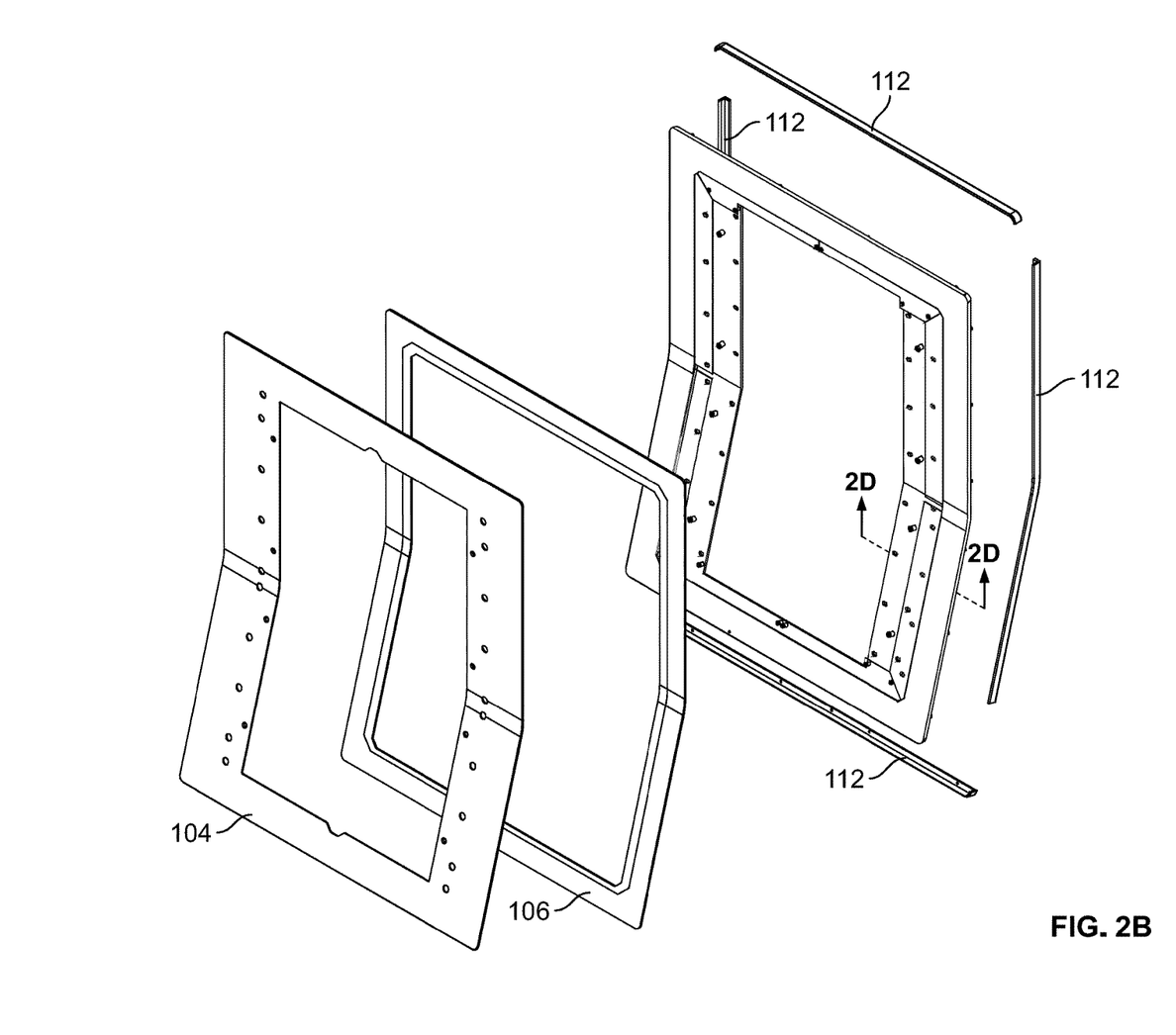

FIG. 2B shows the lighting brackets 118a-g installed on the rear panel 110. In the illustrated embodiment, the front face 124 of the rear panel 110 includes a recessed portion 132 and a raised portion 134 (see, e.g., FIGS. 1B, 2D & 2E). The first bosses 122 project upwardly from the recessed portion 132 and support the lighting brackets 118a-g above the recessed portion 132 and in vertical alignment with the top of the raised portion 134.

Each lighting bracket 118a-g carries a plurality of lighting elements, such as light emitting diodes (LEDs) 138. In one or more embodiments, the LEDs 138 are mounted to the bottom face of a lighting bracket 118 so that they align with the top of the raised portion 134. In some embodiments, the plurality of LEDs 138 may be formed from LED strips that are cut to length and attached to the bottom face of the lighting bracket 118, e.g., by adhesive (see, e.g., FIGS. 1B, 2D & 2E). The LEDs 138 can be energized to produce visible light. According to one or more embodiments, the LEDs 138 can produce full-color light.

Figure 3A:
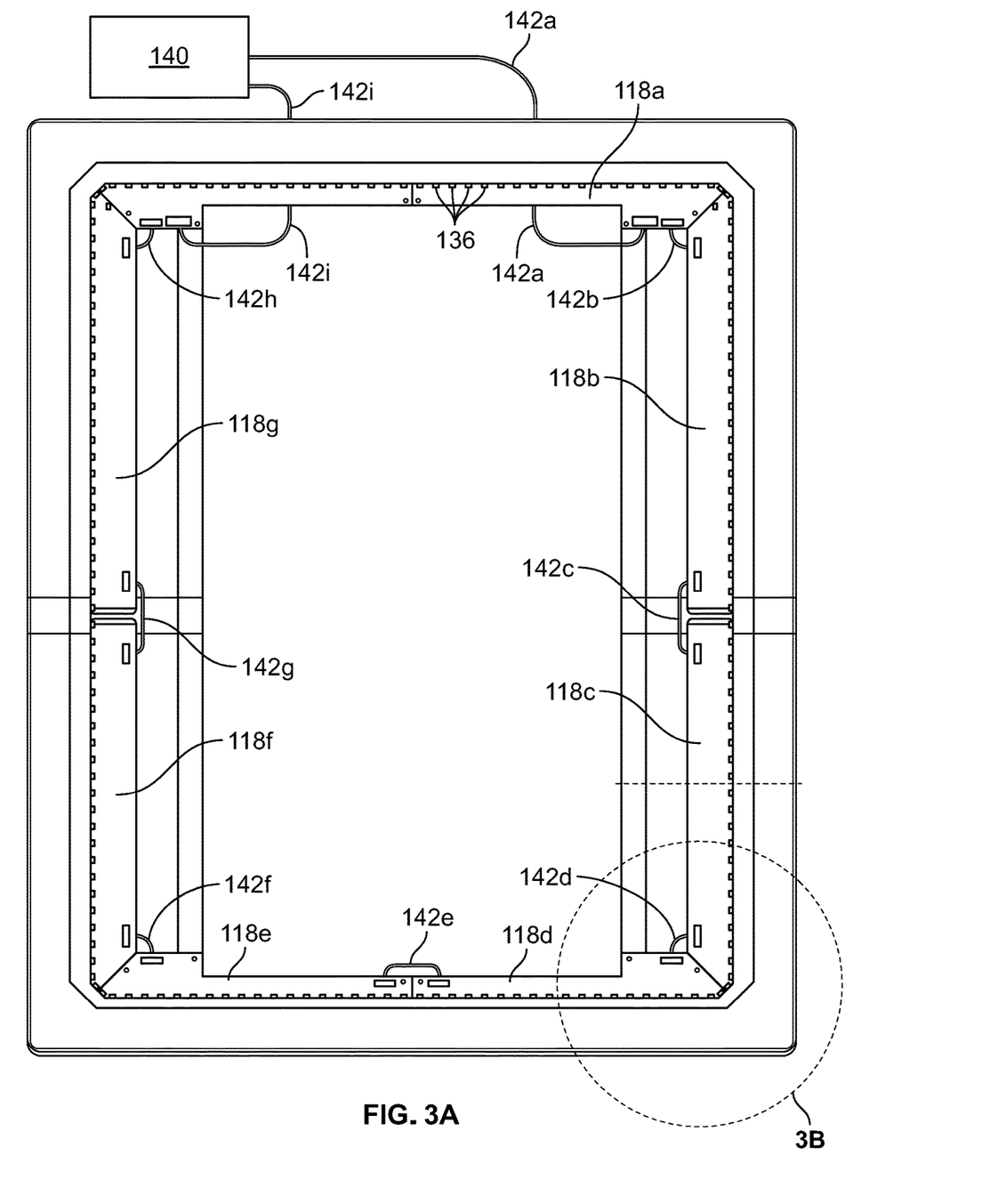
FIG. 3A is a front elevation view further illustrating the lighting display assembly interconnected with a lighting controller.

With further reference to FIG. 3A, operation of the LEDs 138 may be controlled according to a control signal that may be provided by a lighting controller 140. In some embodiments, the LEDs 138 may be interconnected with the lighting controller by a plurality of connectors, e.g., wires. For example, in the illustrated embodiment, a first connector 142a interconnects the LEDs 138 of the first lighting bracket 118a to the lighting controller 140. A second connector 142b interconnects the LEDs 138 of the first and second lighting brackets 118a, 118b. A third connector 142c interconnects the LEDs 138 of the second and third lighting brackets 118b, 118c. A fourth connector 142d interconnects the LEDs 138 of the third and fourth lighting brackets 118c, 118d. A fifth connector 142e interconnects the LEDs 138 of the fourth and fifth lighting brackets 118d, 118e. A sixth connector 142f interconnects the LEDs 138 of the fifth and sixth lighting brackets 118e, 118f. A seventh connector 142g interconnects the LEDs 138 of the sixth and seventh lighting brackets 118f, 118g. An eighth connector 142h interconnects the LEDs 138 of eighth lighting brackets 118h with the LEDs on the first lighting bracket 118a. And, a ninth connector 142i interconnects the LEDs 138 on the first lighting bracket 118a with the lighting controller 140 with the lighting controller 140. Control signals may be supplied from the lighting controller 140 to the LEDs 138 via the connectors 142a-i for controlling operation (e.g., activation, deactivation, intensity, and/or color) of the LEDs 138. In at least some embodiments, each lighting bracket may include one or more LED driver chips for controlling operation of the LEDs on a respective bracket in response to the control signals. In some embodiments, pairs of LEDs may be connected in series to a respective driver chip. In certain embodiments, each LED driver chip may control a determined number of RGB (red, green, blude) LEDs or pairs of LEDs. In certain specific embodiments, each LED driver may control 8 RGB (red, green, blude) LEDs or pairs of LEDs for 24 outputs in total, e.g., 8×3 RGB signals.

The light guide plate 106 is formed of a single piece of material that is transparent to visible light. In some embodiments, the light guide plate 106 is formed from clear acrylic, such as polymethyl methacrylate (PMMA). In other embodiments, the light guide plate may be formed from a variety of different materials including, for example, polycarbonate or cycloolefin polymer. The light guide plate 106 has a front surface 150, a rear surface 152, and a center opening 154 extending between the front and rear surfaces and defining an inner sidewall 156.

Figure 2C:
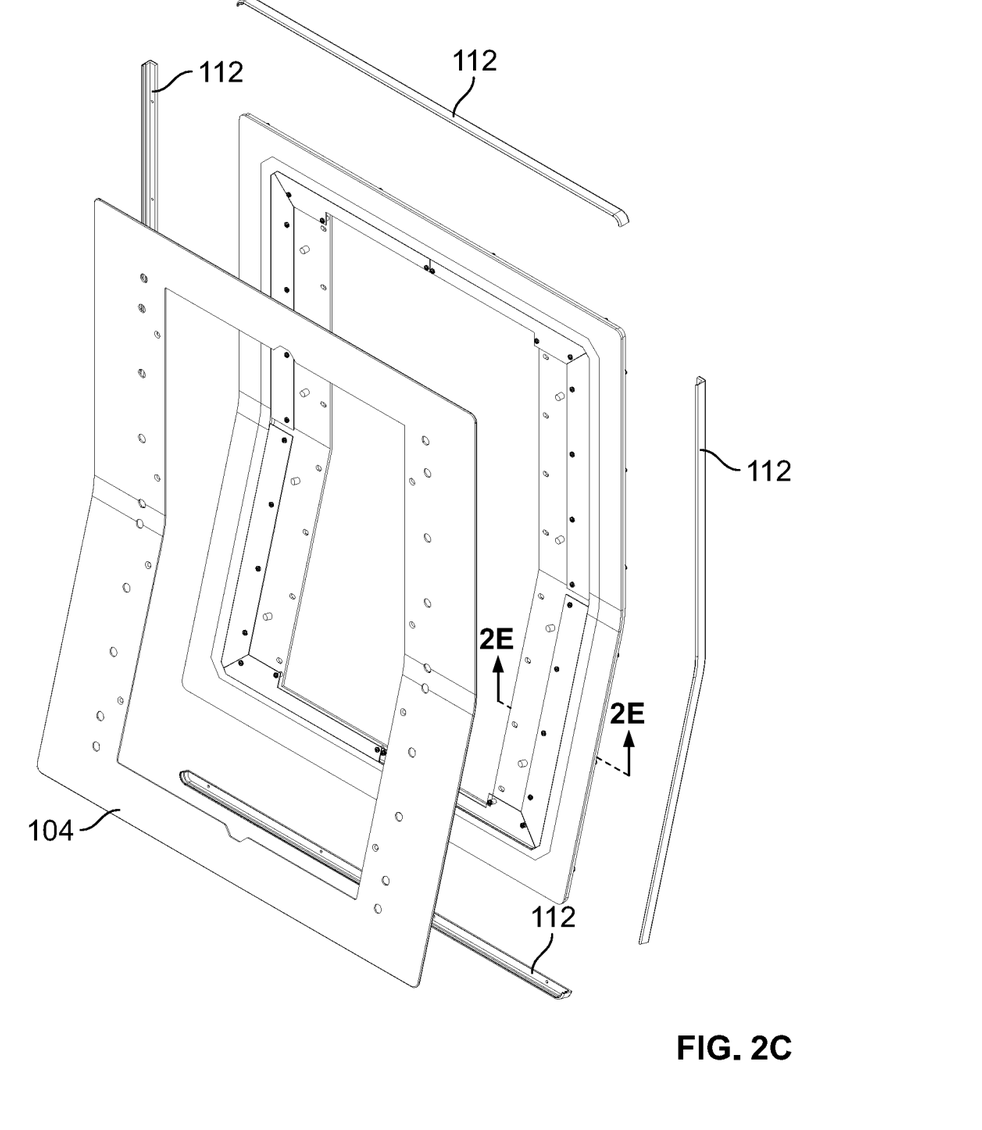
Figure 2D:
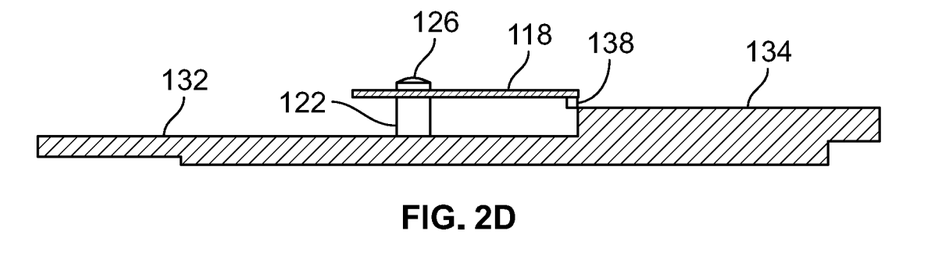
FIG. 2D is a cross-sectional view along line 2D-2D of FIG. 2B.
Figure 2E:
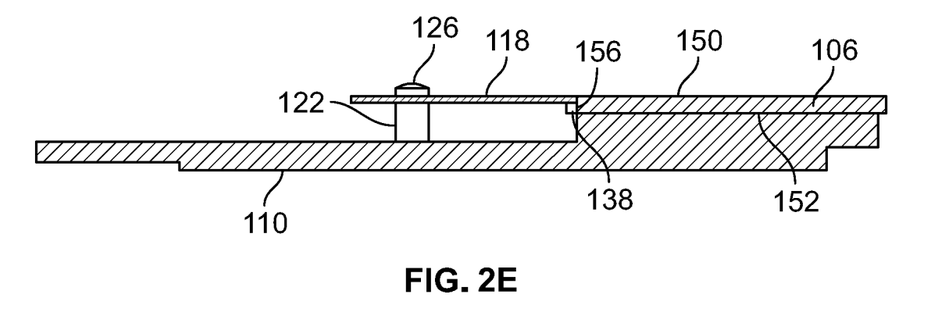
FIG. 2E is a cross-sectional view along line 2E-2E of FIG. 2C.
Figure 2F:
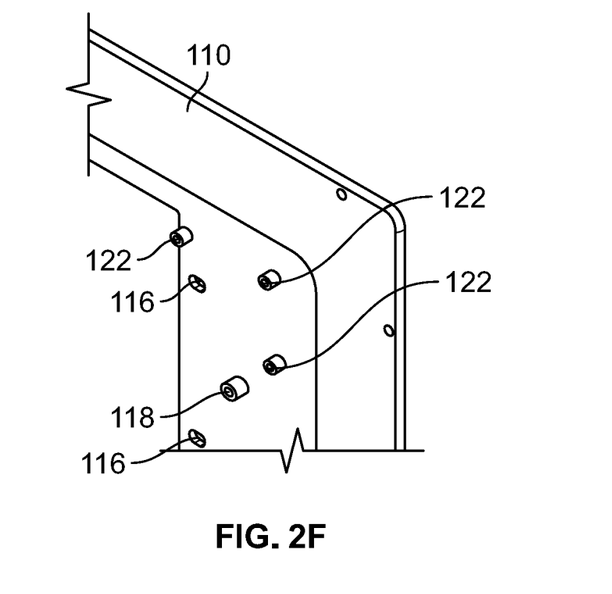
FIG. 2F is an enlarged view of a portion of FIG. 2A.
Figure 2G:
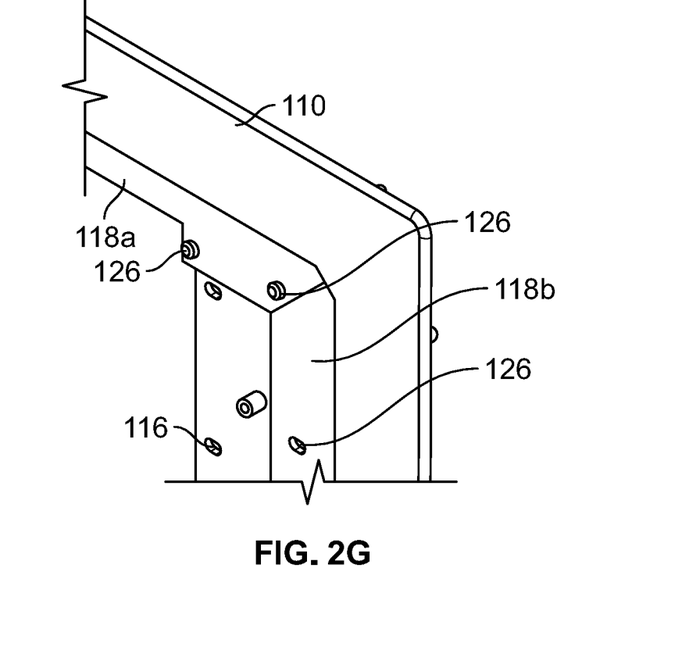
FIG. 2G is an enlarged view of a portion of FIG. 2B.

As shown in FIGS. 2C and 2E, the light guide plate 106 is installed onto the raised portion 134 of the rear panel 110 with its center opening 154 overlying the center opening 114 in the rear panel 110. In some embodiments, the center opening 154 of the light guide plate 106 is sized and shaped to form a close fit around the outer periphery of the lighting brackets 118a-g (see, e.g., FIG. 2E). In this manner, the lighting brackets 118a-118g function to aid with installation of the light guide plate 106 onto the rear panel 110 and to maintain the orientation of the light guide plate 106 relative to the LEDs 136.

Once installed, the inner sidewall 156 of the light guide plate 106 is aligned with and closely adjacent to the LEDs 138 (see, e.g., FIG. 2E). Light emitted from the LEDs 138 passes through the inner sidewall 156 and into the light guide plate 106. A pattern formed in the light guide plate is positioned to be illuminated by the visible light emitted from the light source 108 and entering the sidewall 156 of the light guide plate 106 so that the illuminated pattern is visible through the front surface 150 of the light guide plate 106.

In some embodiments, the pattern may be formed in or on the rear surface 152 of the light guide plate 106. In some embodiments, the pattern is formed by laser etching the pattern into the rear surface of the light guide plate. In some embodiments, the pattern may be screen printed onto the rear surface 152 of the light guide plate 106. A variety of other techniques may be used to form the pattern, including, for example, machining, milling, chemical etching, etc. The pattern redirects at least a portion of the visible light emitted from the light source and entering the sidewall of the light guide plate towards the front surface of the light guide plate. In some embodiments, the pattern reflects and/or refracts at least a portion the visible light emitted from the light source and entering the sidewall of the light guide plate towards the front surface of the light guide plate.

Figure 4A:
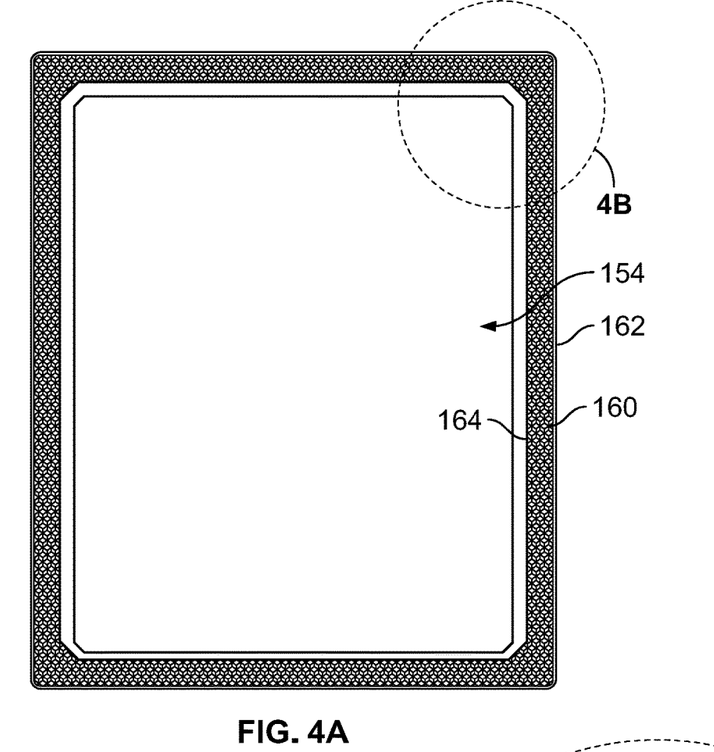
FIG. 4A is a front elevation view of an embodiment of a light guide plate from the lighting display assembly.
Figure 4B:
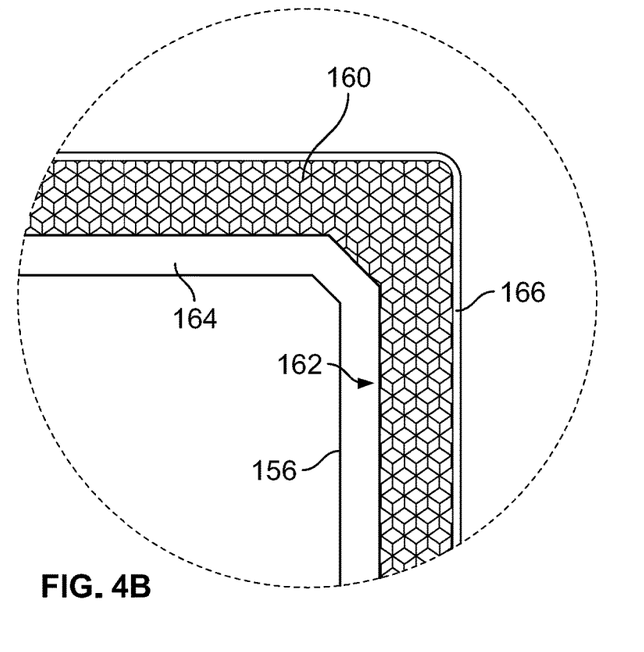
FIG. 4B is an enlarged view of a portion of FIG. 4A.

An example of a pattern 160 is shown in greater detail in FIGS. 4A and 4B. In this example, the pattern 160 includes a plurality of 3D cubes that are located in a patterned region 162 of the light guide plate 106. While the pattern is illustrated as cubes, the pattern may take a variety of forms, including, for example, geometric shapes, letters, symbols, and/or combinations thereof. In some embodiments, the light guide plate 106 includes an inner non-patterned region 164 adjacent to the center opening 154. As a result, light from the LEDs 138 passes through the non-patterned region 164 without being deflected towards the front surface 150 before hitting the pattern 160 where it is deflected towards the front surface 150, illuminating the pattern.

Figure 3B:
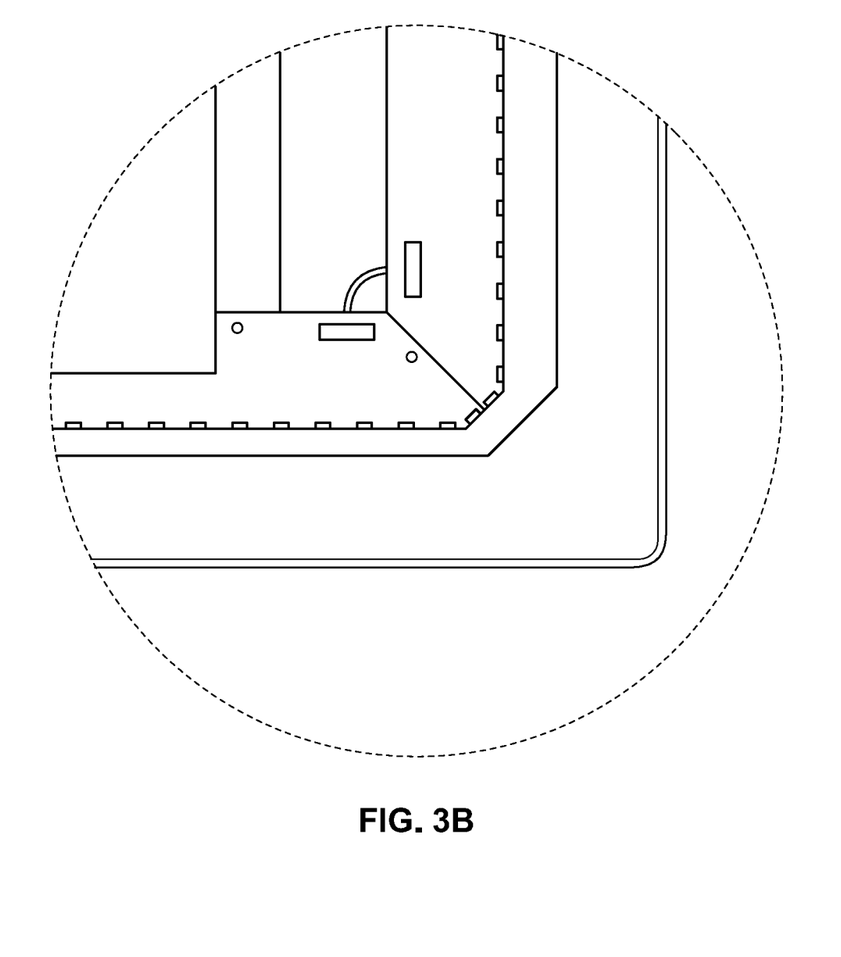
FIG. 3B is an enlarged view of a portion of FIG. 3A.

The LEDs 138 may be spaced at regular intervals to provide consistent illumination of the pattern 160. In some embodiments, the LEDs 138 may be spaced at a 15 mm pitch, for example. The spacing may be varied in different embodiments to achieve the desired light intensity and to reduce spotting. As shown in FIGS. 3A and 3B, for example, the internal corners of the light guide plate 106 may be beveled at a determined angle. For example, in some embodiments, the corners may be beveled at approximately 45° relative to the inner sidewalls. Reciprocal bevels may be provided on the corners of the lighting brackets. In some embodiments, the spacing between LEDs in the beveled corners may be reduced in comparison to the spacing along the linear sidewalls. The combination of beveled corners and reduced LED spacing in this region may function to better illuminate the outer corners of the light guide plate 106.

The light guide plate 106 may also include an outer non-patterned region 166 along its outer edge. A chamfer may be formed in the back surface of the light guide plate in this outer non-patterned region 166. The chamfer may function to redirect light towards the front surface to create a glow at the outer edge of the light guide plate.

The protective cover 104 is mounted on top of the light guide plate 106 and is secured in place by fasteners that extend through openings in the protective cover and thread into threaded openings formed in the rear panel 110. In the illustrated embodiment, the threaded openings are formed in second bosses 170 (see, e.g., FIG. 2G) that project from the front face of the rear panel 110. The protective cover 104 includes a center opening 172 that overlies the center openings in the light guide plate 106 and the rear panel 110. The rear panel 110 includes a mounting feature to permit the lighting display assembly 100 to be mounted to a gaming machine, for example. In the illustrated embodiment, the mounting feature includes a plurality of apertures 116 positioned along the center opening 114 in the rear panel 110 that allow the rear panel to be secured to the gaming machine using threaded fasteners, such as bolts. The center opening 172 in the protective cover 104 is sized so that the apertures 116 in the rear panel 110 can be accessed through the center opening to facilitate installation the lighting display assembly 100 onto a gaming machine. The protective cover 104 is made from a clear, relatively hard material, such as a polycarbonate, and functions to prevent damage to the light guide plate 106.

The side covers 112 are installed around the outer edges of the lighting display assembly 100 to conceal the sides of the other components and provide a finished appearance to the assembly. Mounting features (not shown) may be formed on the side covers and one or more other components of the assembly 100 to secure the side covers in place. Alternatively, in some embodiments, the side covers may be secured in place by adhesive, screws or other connection elements. In some embodiments, the side covers are formed from extruded aluminum. Other suitable materials for the side covers may include plastics and sheet steel, for example.

FIGS. 5A-5D illustrate the lighting display assembly 100 of FIG. 1A installed onto a gaming machine 200. The gaming machine 200 may, for example, be a video slot machine of the type commonly used in the gaming industry. The gaming machine 200 includes a cabinet 202 that supports a display monitor 204.

The lighting display assembly 100 is designed to be positioned on the gaming machine behind the display monitor 204. As can be seen, the lighting display assembly 100 is sized and positioned to extend beyond the outer edge (periphery) 206 of the display monitor or such that the illuminated pattern 160 is visible from in front of the display monitor. In some embodiments, only the patterned region 162 of the light guide plate 106 extends outwardly beyond the periphery 206 of the display monitor 204. The lighting display assembly 100 provides a frame or corona of light that extends around the display monitor 204. The LEDs can be controlled by the lighting controller to controllably illuminate the pattern in the light guide plate 106 to attract players to the gaming machine. In at least some embodiments, the center opening of the light guide plate is positioned inward of the outer peripheral edge of the display monitor such that it is not visible from in front of the display monitor. Similarly, in at least some embodiments, the inner non-patterned region 164 of the light guide plate 106 is positioned behind the monitor so that it is not visible from in front of the display monitor.

Figure 5A:
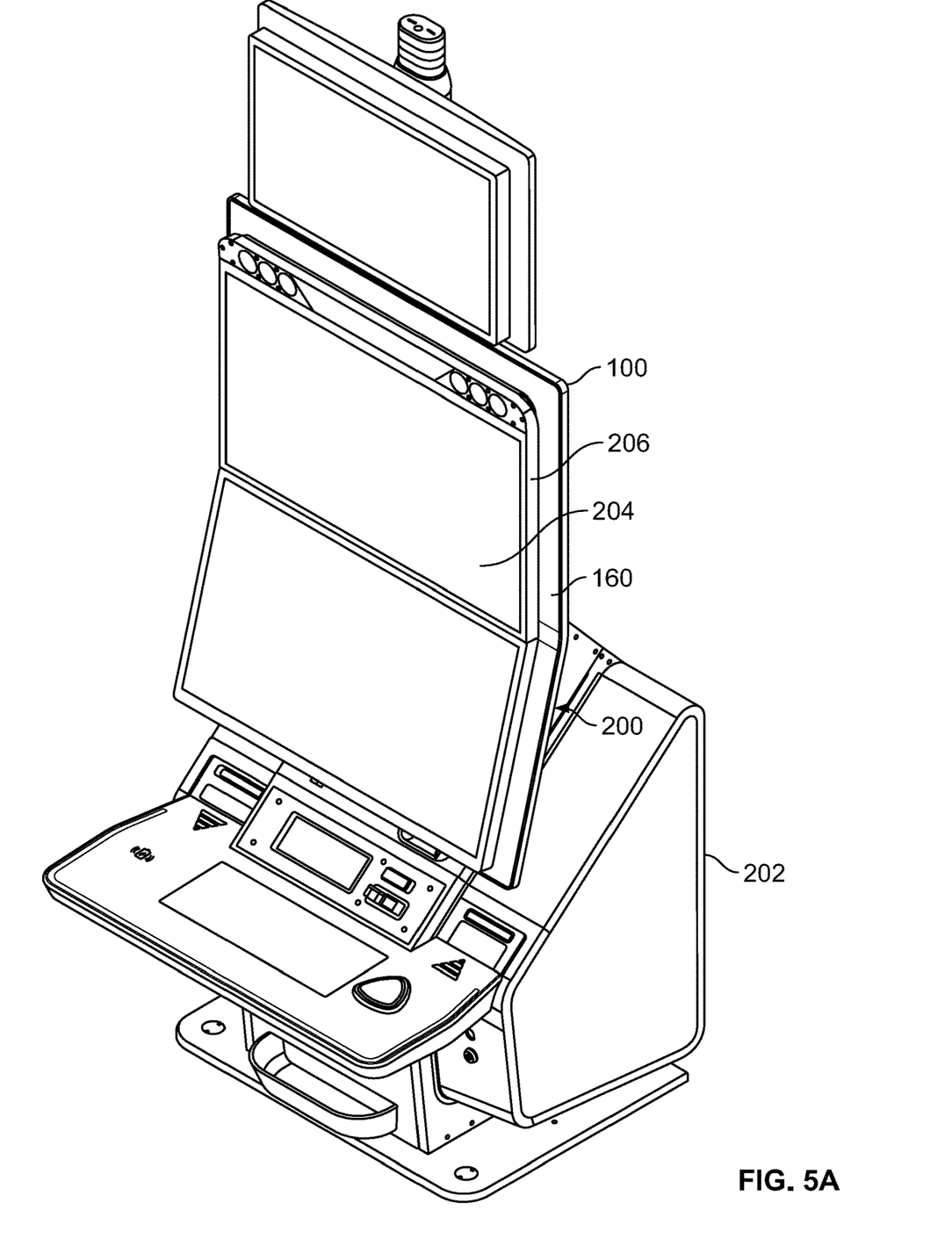
FIGS. 5A-5D illustrate the lighting display assembly installed on a gaming machine.
Figure 5B:
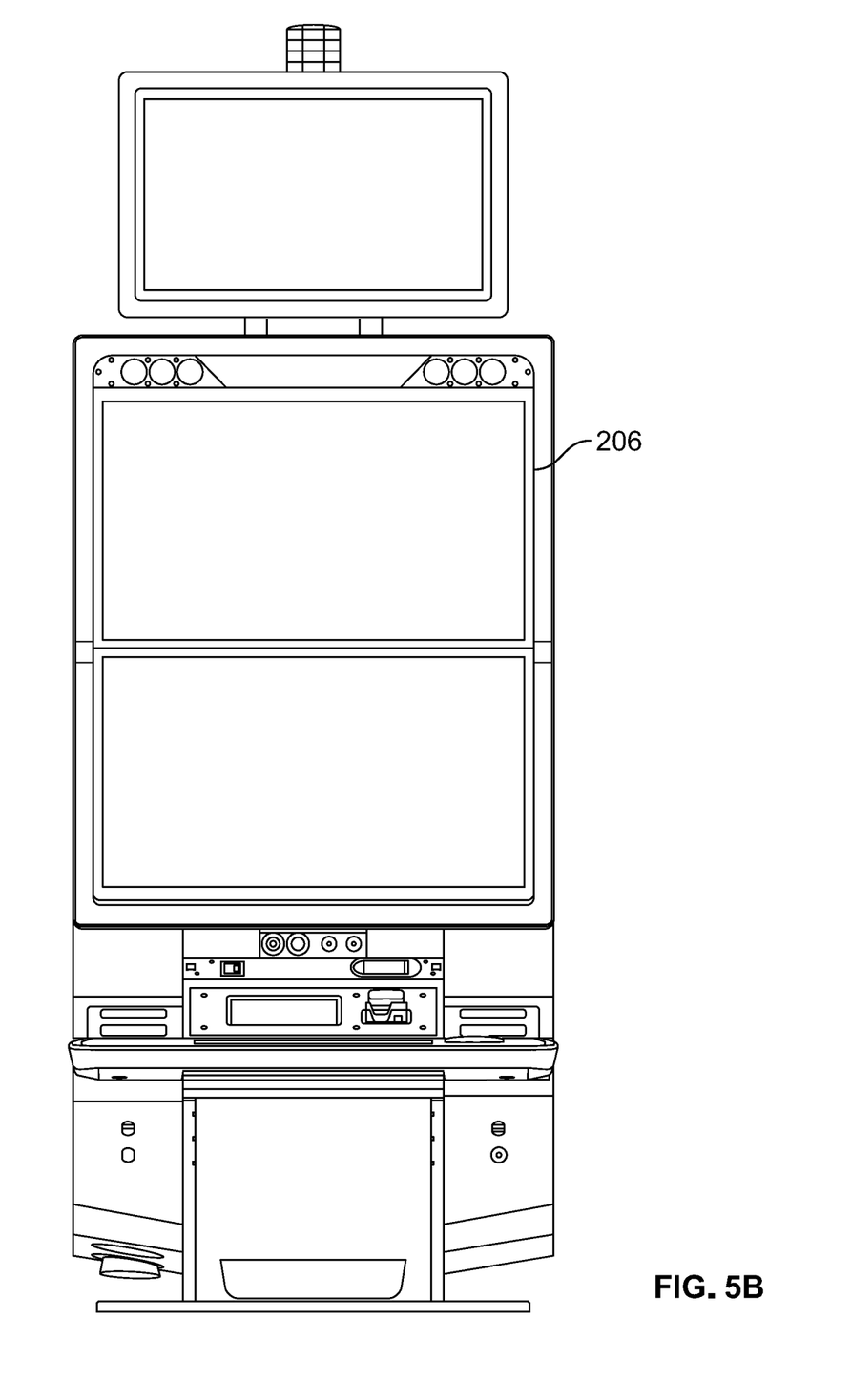
Figure 5C:
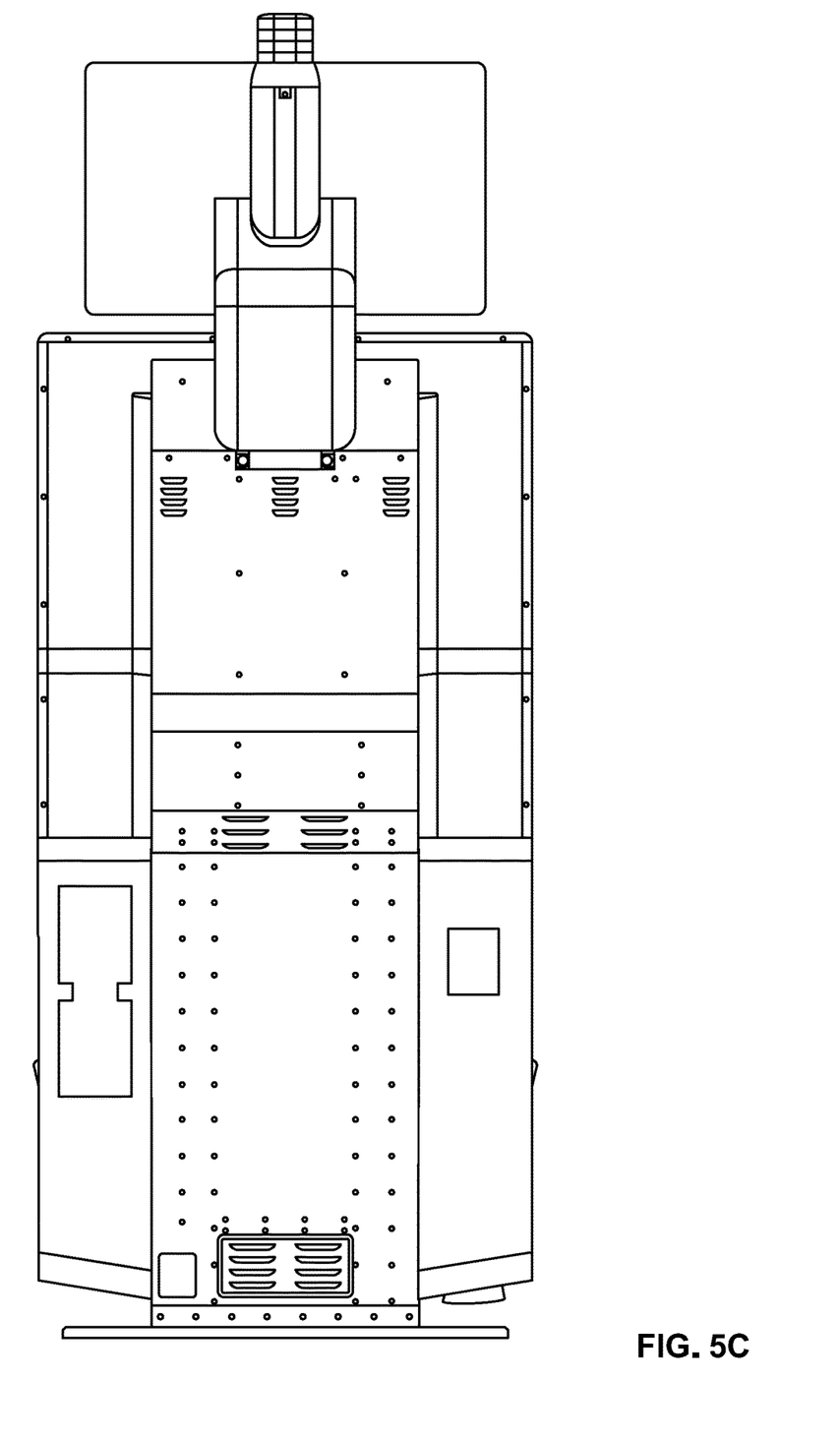
Figure 5D:
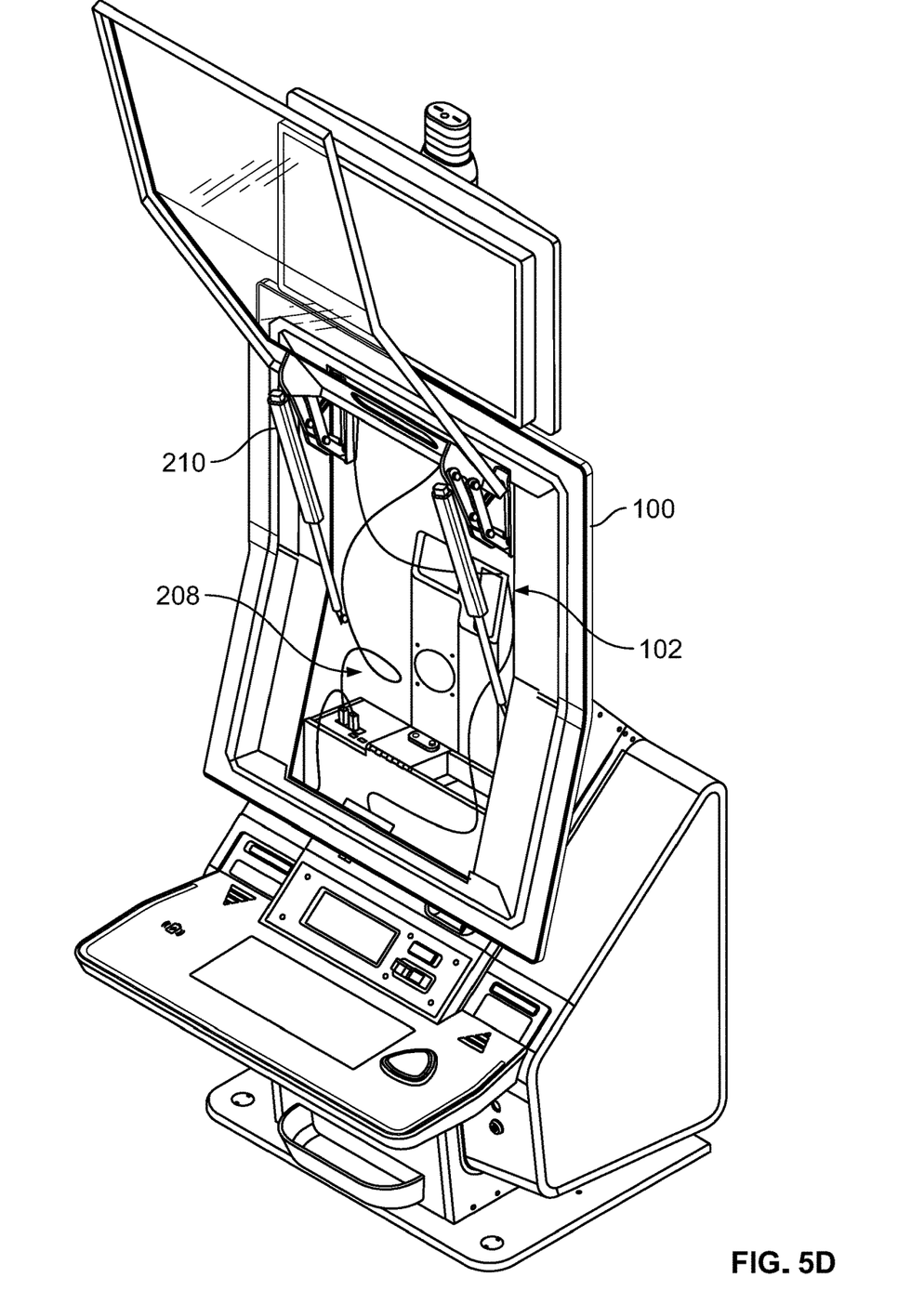

The center opening 102 of the lighting display assembly 100 is beneficial because it allows access to the interior of the gaming machine cabinet 202, e.g., for servicing the gaming machine 200. In some embodiments, a mounting mechanism securing the display monitor to the gaming machine may also extend through the center opening of the lighting display assembly. For example, as shown in FIG. 5D, the display monitor 204 may be connected to the gaming machine cabinet by a lift arm assembly 210 that allows the display monitor to be moved between a lowered position during normal operation (see, e.g., FIG. 5A) and a raised position (see, e.g., FIG. 5D) for servicing.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

What is claimed is:

1. A lighting display assembly comprising:
   a light guide plate formed from a single piece of material that is transparent to visible light, the light guide plate including a front surface, a rear surface, and a center opening extending between the front and rear surfaces and defining an inner sidewall;
   a light source configured to emit visible light, the light source being positioned facing the inner sidewall so that light emitted therefrom passes through the inner sidewall and into the light guide plate;
   a pattern formed in the light guide plate and positioned to be illuminated by the visible light emitted from the light source and entering the inner sidewall of the light guide plate so that the pattern is visible through the front surface of the light guide plate; and
   a controller configured to controllably activate and deactivate the light source.

2. The lighting display assembly of claim 1, wherein the pattern redirects at least a portion of the visible light emitted from the light source and entering the inner sidewall of the light guide plate towards the front surface of the light guide plate.

3. The lighting display assembly of claim 2, wherein the pattern reflects and/or refracts at least a portion the visible light emitted from the light source and entering the inner sidewall of the light guide plate towards the front surface of the light guide plate.

4. The lighting display assembly of claim 1, wherein the lighting display assembly is configured to be mounted behind a display monitor and is sized to extend laterally beyond an outer peripheral edge of the display monitor such that the pattern is visible from in front of the display monitor.

5. The lighting display assembly of claim 4, wherein the center opening of the light guide plate is positioned inward of the outer peripheral edge of the display monitor when the lighting display assembly is mounted behind the display monitor.

6. The lighting display assembly of claim 1, further comprises a rear panel that is configured to support the light guide plate and the light source relative to one another.

7. The lighting display assembly of claim 6, wherein the light source comprises a bracket that carries a plurality of light emitting diodes and wherein the bracket includes a feature configured to secure the bracket to the rear panel.

8. The lighting display assembly of claim 7, wherein the light source comprises a plurality of brackets that each carry a plurality of light emitting diodes.

9. The lighting display assembly of claim 1, wherein the pattern is formed in the rear surface of the light guide plate.

10. The lighting display assembly of claim 9, wherein the pattern is screen printed onto the rear surface of the light guide plate.

11. A gaming machine comprising:
    a cabinet;
    a display monitor supported by the cabinet and having an outer peripheral edge;
    a lighting display assembly positioned behind the display monitor and comprising:
    a light guide plate formed from a single piece of material that is transparent to visible light, the light guide plate including a front surface, a rear surface, and a center opening extending between the front and rear surfaces and defining an inner sidewall;
    a light source configured to emit visible light, the light source positioned facing the inner sidewall so that light emitted therefrom passes through the inner sidewall and into the light guide plate; and
    a pattern formed in the light guide plate and positioned to be illuminated by the visible light emitted from the light source and entering the inner sidewall of the light guide plate so that the pattern is visible through the front surface of the light guide plate; and
    a controller configured to controllably activate and deactivate the light source;
    wherein the light guide plate is sized to extend laterally beyond the outer peripheral edge of the display monitor such that the pattern is visible from in front of the display monitor.

12. The gaming machine of claim 11, wherein the lighting display assembly further comprises a mounting feature configured to secure the lighting display assembly to at least one of the cabinet and the display monitor.

13. The gaming machine of claim 11, further comprising a mounting mechanism securing the display monitor to the gaming machine, the mounting mechanism extending through the center opening of the light guide plate.

14. The gaming machine of claim 13, wherein the center opening of the light guide plate is positioned inward of the outer peripheral edge of the display monitor.

15. The gaming machine of claim 11, further comprises a rear panel that is configured to support the light guide plate and the light source relative to one another.

16. The gaming machine of claim 15, wherein the light source comprises a bracket that carries a plurality of light emitting diodes and wherein the bracket includes a feature configured to secure the bracket to the rear panel.

17. The gaming machine of claim 16, wherein the light source comprises a plurality of brackets that each include a plurality of light emitting diodes.

18. The gaming machine of claim 11, wherein the pattern is formed in the rear surface of the light guide plate.

19. The gaming machine of claim 18, wherein the pattern is screen printed onto the rear surface of the light guide plate.

20. A lighting display assembly comprising:
    a rear panel having a center opening;
    a light guide plate formed from a single piece of material that is transparent to visible light, the light guide plate including a front surface, a rear surface, and a center opening extending between the front and rear surfaces and defining an inner sidewall, the light guide plate overlying the rear panel with its center opening being aligned with the center opening of the rear panel;
    a light source configured to emit visible light, the light source being positioned facing the inner sidewall of the light guide plate so that light emitted therefrom passes through the inner sidewall and into the light guide plate;

a pattern formed in the light guide plate and positioned to be illuminated by the visible light emitted from the light source and entering the inner sidewall of the light guide plate so that the pattern is visible through the front surface of the light guide plate; and a controller configured to controllably activate and deactivate the light source.

21. The lighting display assembly of claim 20, further comprising a protective cover overlying the light guide plate.

22. The lighting display assembly of claim 20, the rear panel is configured to support the light guide plate and the light source relative to one another.

23. The lighting display assembly of claim 22, wherein the light source comprises a bracket that carries a plurality of light emitting diodes, the bracket being mounted to the rear panel such that the plurality of light emitting diodes align with the inner sidewall of the light guide plate so that light emitted therefrom passes through the inner sidewall and into the light guide plate.

24. The lighting display assembly of claim 23, wherein the pattern is formed in the rear surface of the light guide plate.

* * * * *